United States Patent [19]
Sakai

[11] Patent Number: 5,523,806
[45] Date of Patent: Jun. 4, 1996

[54] EYEGLASSES HAVING IMPROVED LENS FASTENING MEMBER

[75] Inventor: Yuichi Sakai, Fukui-ken, Japan

[73] Assignee: Shuyu Co., Ltd., Fukui-ken, Japan

[21] Appl. No.: 466,730

[22] Filed: Jun. 6, 1995

[30] Foreign Application Priority Data

Jan. 23, 1995 [JP] Japan ................. 7-000670 U

[51] Int. Cl.$^6$ ........................................ G02C 1/08
[52] U.S. Cl. ...................... 351/101; 351/95; 351/96; 351/97; 351/98
[58] Field of Search ................... 351/83, 84, 85, 351/86, 90, 92, 95, 96, 97, 98, 101, 110, 135, 124

[56] References Cited

U.S. PATENT DOCUMENTS

| 1,272,833 | 7/1918 | Metcalf | 351/97 |
| 2,117,436 | 5/1938 | Lindbolm | 351/97 |
| 2,551,144 | 5/1951 | Lindemann et al. | 351/97 |

FOREIGN PATENT DOCUMENTS

| 592096 | 3/1924 | France | 351/90 |
| 0574837 | 7/1924 | France | 351/97 |
| 1011616 | 6/1952 | France | 351/101 |

*Primary Examiner*—William L. Sikes
*Assistant Examiner*—James A. Dudek
*Attorney, Agent, or Firm*—Nikaido Marmelstein Murray & Oram

[57] ABSTRACT

To avoid excessive stressing of lenses and still facilitate the attaching and removing of the lens to the rim, a pair of eyeglasses has an improved rim lock member. The rim lock member has a two-parallel wire arrangement and a metal piece slidably movable thereon. The opposite ends of the loop hole of each rim are connected to the two parallel wire ends, and the space of the loop hole can be controlled by moving the metal piece on the two-parallel wire arrangement. Specifically the loop hole of each rim can be reduced by moving the metal piece toward the rim on the two-parallel wire arrangement until the circumferential length of time rim is shortened to wind tightly around the lens, thereby holding the lens fixedly. The bridge of the front of a pair of rimless eyeglasses has a similar parallel wire-and-metal assembly structure.

3 Claims, 2 Drawing Sheets

EYEGLASSES HAVING IMPROVED LENS FASTENING MEMBER

BACKGROUND OF THE INVENTION

1. Field of the Invention

The present invention relates to an improvement in or relating to rim lock means to fasten lenses to the rims of the front of the frame of a pair of eyeglasses, and an improvement in or relating to bridge means to connect the lenses in a pair of rimless eyeglasses.

2. Description of Related Art

In general, the frame of a pair of eyeglasses comprises a front and two opposite temples, and the front comprises two rims each enclosing tightly fastening one or the other lens with associated rim lock means, and a bridge connection the adjacent rims, each having a joint piece soldered to its outer side and one or the other temple hinged to the joint.

The rim lock means has a screw to tighten the loop hole ends of the rim for reducing the circumferential length of the rim, thereby fastening the lens to the rim. When the screw is tightened excessively, the lens will be stressed badly. On the contrary when the screw is tightened loosely, the lens may be easily slipped off from the rim. Also, if the lenses are tightly fastened to the rims by associated screws, it is most likely that the lenses are stressed when the temples are inadvertently twisted in removing from the face.

The conventional rim lock means has no adjustable means to compensate for any permissible deviations from the correct size of the lens and the correct circumferential length of the rim, and therefore, sometimes it happens that the lens slips off from the rim or that the lens is stressed too much even if such rim rock means is normally used. The rim lock means is hidden behind a joint piece, to which the temple is connected, thereby preventing exposure of the rim lock means for pleasing appearance.

Rimless eyeglasses have been popular, each using a bridge connected to the inner edges of the adjacent lenses and two temples each directly riveted to the outer edge of each lens. The bridge and the temples are so rigid that the lens happen to be stressed so excessively as to be partly broken.

SUMMARY OF THE INVENTION

One object of the present invention is to provide a pair of eyeglasses which are guaranteed to be free of the excessive stressing of lenses, still facilitating the attaching and removing of the lens to the rim.

Another object of the present invention is to provide a pair of rimless eyeglasses which are guaranteed to be free of the destructive stressing of lenses.

To attain these objects a pair of eyeglasses comprising two lenses and a frame comprising a front and two opposite temples, said front comprising two rims each enclosing and tightly fastening one or the other lens with associated rim lock means, and a bridge connecting the rims, each having one or the other temple hinged to its outer edge which is opposite to the inner edge to which the bridge is connected to the rim, is improved according to the present invention in that said rim lock means includes two parallel metal wires soldered to the opposite ends of the loop hole of each rim, a metal piece slidably movable on said parallel metal wires to control the space therebetween, said metal piece having a joint piece fixed to its rear side, the joint piece having the temple hinged thereto.

A pair of eyeglasses comprising two lenses and a frame comprising a front the two opposite temples, said front comprising two rims each enclosing and tightly fastening one or the other lens withe associated rim lock means, and a bridge connecting the rims, each having one or the other temple hinged to its outer edge which is opposite to the inner edge to which the bridge is connected, is improved according to the present invention in that said rim lock means includes two parallel metal wires soldered to the opposite ends of the loop hole of each rim, and a metal piece slidable on said parallel metal wires to control the space therebetween, one or the other temple being hinged to the end of each metal.

This structure facilitates the attaching and removing of lenses from the rims, still permitting the tightening of the rims around the lenses without excessive stress caused therein. Each of the two parallel wires has an "L"-shape, and one end of the "L"-shaped wire is soldered to each end of the loop hole of each rim, and the other end of the "L"-shaped wire is integrally connected to the corresponding end of the counter "L"-shaped wire to form a "U"-shaped end. A metal piece having two through holes is slidably attached to the parallel wire arrangement by threading the wires in the through holes of the metal piece. The opposite ends of the loop hole of each rim are made to get close to each other by moving the metal piece toward the rim, and are made to leave apart from each other by moving the metal piece apart from the rim. Thus, the tightening of the rim around the lens can be controlled.

Also, a pair of rimless eyeglasses comprising two lenses, a bridge connecting the two lenses, two opposite temples and attaching means to attach each temple to the outer edge of one or the other lens, is improved according to the present invention in that said bridge comprises two parallel metal wires having their opposite ends inserted in the apertures of the lenses to be fixed thereto, and two metal pieces slidably movable on said parallel metal wires to control the space therebetween; and said attaching means comprising two parallel metal wires and a metal piece slidably movable thereon to control the space therebetween, whereby the lenses are tightly connected to each other and to the temples by moving the associated metal pieces toward the lenses.

Two metal pieces each having two through holes are slidably attached to the parallel-wire bridge by threading the wires through their through holes. The bridge will be tightened by moving the metal pieces toward the lenses, thereby connecting the lenses tightly.

Other objects and advantages of the present invention will be understood from the following description of eyeglasses according to preferred embodiments of the present invention, which are shown in accompanying drawings:

DESCRIPTION OF THE PREFERRED EMBODIMENTS

Figure 1:
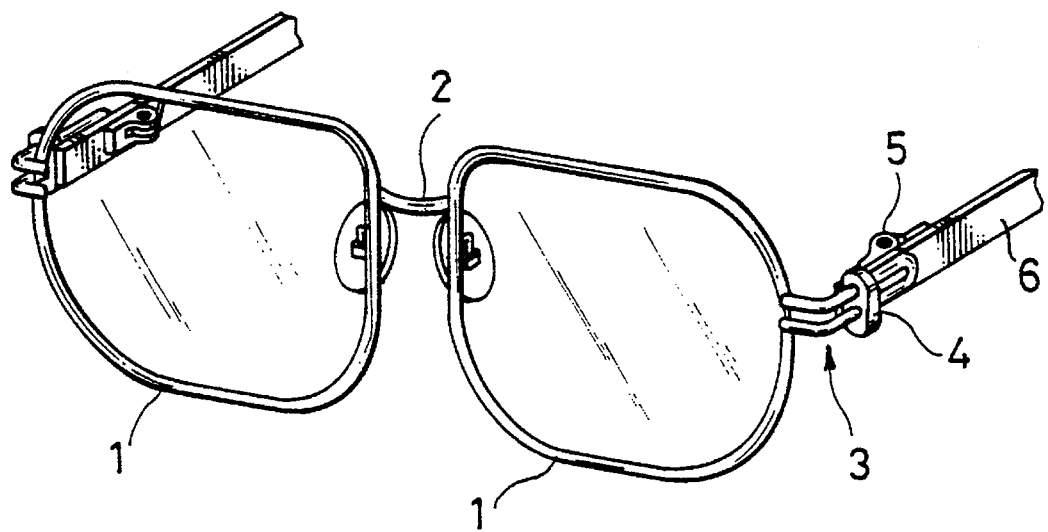
FIG. 1 is a perspective view of a pair of eyeglasses according to one embodiment of the present invention.

Referring to FIG. 1, a pair of eyeglasses according to one embodiment of the present invention comprises two lenses and a frame comprising a front and two opposite temples 6. The front comprises two rims 1 each enclosing and tightly fastening one or the other lens with associated rim lock 3 (later described), and a bridge 2 connecting these rims 1. As later described, the rim lock 3 has no screws for tightening the rim.

Each rim lock 3 has a slidable metal piece 4. The slidable metal piece 4 has a hinge 5 fixed thereto, and the temple 6 is fixed to the hinge 5. Alternatively the temple 6 can be hinged to the outer end of the rim lock 3. Appropriate joints other than the hinge 5 can be used.

Figure 2:
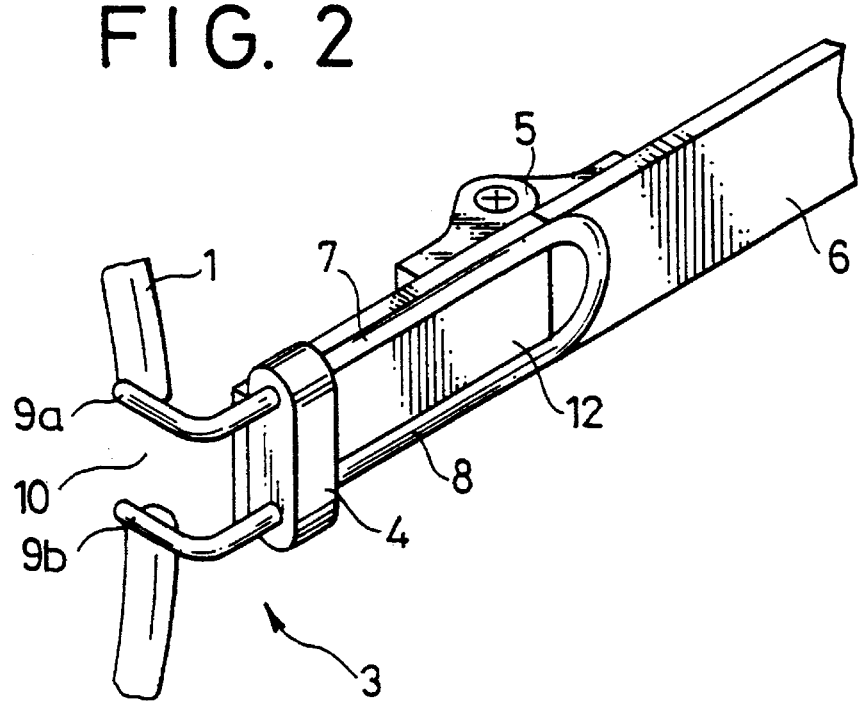
FIG. 2 is a perspective view of a rim lock fixed to the outer edge of the lens.

FIG. 2 shows same details of the rim lock 3. Each of upper and lower parallel wires 7 and 8 has an "L"-shape, and one end 9a or 9b of the "L"-shaped wire is soldered to one or the other end of the loop hole 10 of each rim 1. The other end of the "L"-shaped wire 7 is integrally connected to the corresponding end of the counter "L"-shaped wire 8 to form a "U"-shaped end. The two-parallel wire rim lock 3 looks like the joint piece of the frame with its center part removed in a conventional pair of eyeglasses.

The circumferential length of each rim 1 can be shortened by reducing the loop hole 10 of the rim 1, and can be elongated by expanding the loop hole 10 of the rim 1. Once the circumferential length of the rim 1 is elongated long enough to accomodate the lens by expanding the loop hole 10 of the rim 1, the loop hole 10 is reduced to tightly fix the lens in the rim 1.

To adjust the space of the loop hole 10 of each rim a metal piece 4 having two through holes is slidably attached to the parallel wire arrangement by inserting the upper and lower wires 7 and 8 in the through holes of the metal piece 4. The opposite ends of the loop hole 10 are made to get close to each other by moving the metal piece 4 toward the rim 1, and are made to leave apart from each other by moving the metal piece 4 apart from the rim 1. Thus, the tightening of the rim around the lens can be controlled. Each metal piece 4 has a metal slide 12 fixed to its rear side, and the metal slide 12 has a hinge 5 soldered thereto.

FIG. 2 shows the metal-and-slide assembly as being positioned so close the rim 1 as to permit the circumferential length of the rim to tightly wind about the lens for holding it. When the metal-and-slide assembly is moved backward, the loop hole will be expanded, thereby elongating the circumferential length of the rim long enough to permit the lens to leave the rim 1.

Figure 3:
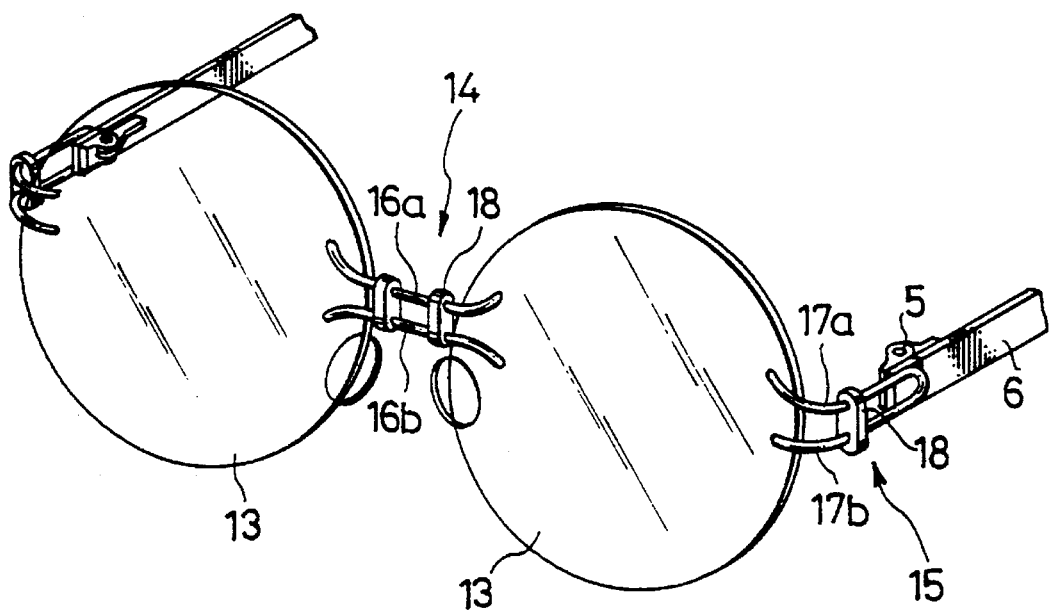
FIG. 3 is a perspective view of a pair of eyeglasses according to another embodiment of the present invention.

FIG. 3 shows a pair of rimless eyeglasses according to another embodiment of the present invention, in which a joint or bridge 14 connects the two lenses 13 directly, and each lens 13 has a temple hinged to its outer edge via a parallel wire joint 15, which comprises two wires 17a and 17b. Their ends are inserted in the apertures of the lenses 13 to be fixed thereto. Likewise, the bridge 14 comprises two parallel metal wires 16a and 16b having their ends inserted in the apertures of the lenses 13 to be fixed thereto. The parallel-wire bridge 16a, 16b has two slidable metal pieces 18, and each parallel-wire joint 17a, 17b has one slidable metal piece 18.

Figure 4:
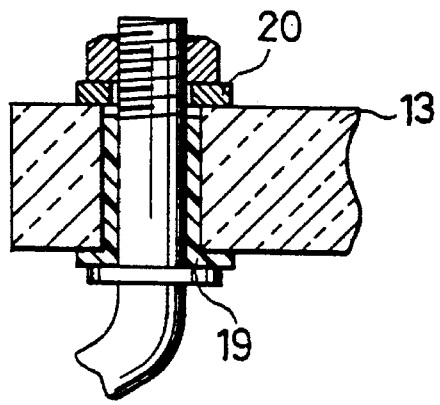
FIG. 4 shows, in section, the manner in which the wire ends are fastened to the lens.

FIG. 4 shows the manner in which the end lengths of the parallel wires 16 and 17 are fixed to the lens 13. As shown, the lens 13 has through holes on its opposite edges to permit the threaded-ends of the wires 16 and 17 to pass therethrough. Resin washers 19 and 20 arc applied to the front and rear sides of the lens 13 to be aligned with the through holes, and the threaded ends of the wires 16 and 17 are inserted in the washers 19 and 20 and in the through holes to be tightened by associated nuts. Thus, the two-parallel wire bridge 14 and the two-parallel wire joints 15 are fixed to the lenses 13. As seen from FIG. 3, two metal pieces 18 are slidably attached to the two-parallel wire bridge 14 by threading the two wires 16a and 16b in the through holes of each metal piece 18, and likewise, one metal piece 18 is slidably attached to each two-parallel wire joints 15. These bridge and joints can be stretched by moving the metal pieces 18 toward the lenses 13, thereby holding the lenses 13 and the temples stable.

To prevent the metal pieces from moving backward to loosen the wires, the metal pieces and wires are provided with projections and slots for holding the metal pieces fixedly in position.

As may be understood from the above, the lock means according to the present invention permits its flexible wires to yieldingly deform to absorb the stresses which otherwise would cause adverse effects on the lenses and/or temples, still assuring the stable connections between the opposite lenses and between each lens and the temple whether a pair of eyeglasses uses rims or not.

I claim:

1. A pair of eyeglasses comprising:

two lenses; and a frame comprising a front portion and two opposite temples, said front portion comprising two rims each enclosing and tightly fastening a lens with an associated rim lock means, and a bridge connecting the rims, each rim having a temple hinged to the rim's outer edge which is opposite to an inner edge to which the bridge is connected, wherein said rim lock means comprises two parallel metal wires with first and second sides, said first side of said metal wires being connected to opposite ends of a loop hole of each rim and said second side of said metal wires being permanently attached to each other, a metal piece slidably movable on said parallel metal wires to control the space therebetween, said metal piece having a joint piece fixed to a rear side of said metal piece the joint piece having the temple hinged thereto.

2. A pair of eyeglasses comprising tow lenses; and a frame comprising a front and two opposite temples, said front comprising two rims each enclosing and tightly fastening a lens with an associated rim lock means, and a bridge connecting the rims, each rim having one or the other temple hinged to the rim's outer edge which is opposite to an inner edge to which the bridge is connected, wherein said rim lock means includes two parallel metal wires with first and second sides, a front side of said metal wires being connected to opposite ends of a loop hole of each rim and a said second side of said metal wires being permanently attached to each other, and a metal piece slidably movable on said parallel metal wires to control a space therebetween, the metal piece having one or the other temple hinged to the metal piece's end.

3. A pair of rimless eyeglasses comprising two lenses, a bridge connecting the two lenses, two opposite temples and attaching means to attach each temple to the outer edge of one or the other lens, characterized in that said bridge comprises two parallel metal wires having their ends inserted in a apertures of the lenses to be fixed thereto, and two metal pieces slidably movable on said parallel metal wires to control the space therebetween, and said attaching means comprises two parallel metal wires and a metal piece slidably movable thereon to control the space between the two parallel metal wires, whereby the lenses are tightly connected to each other and to the temples by moving the associated metal pieces toward the lenses.

* * * * *